June 10, 1924.
C. PITTS
SHORT BELT DRIVE
Filed June 21, 1923
1,497,226
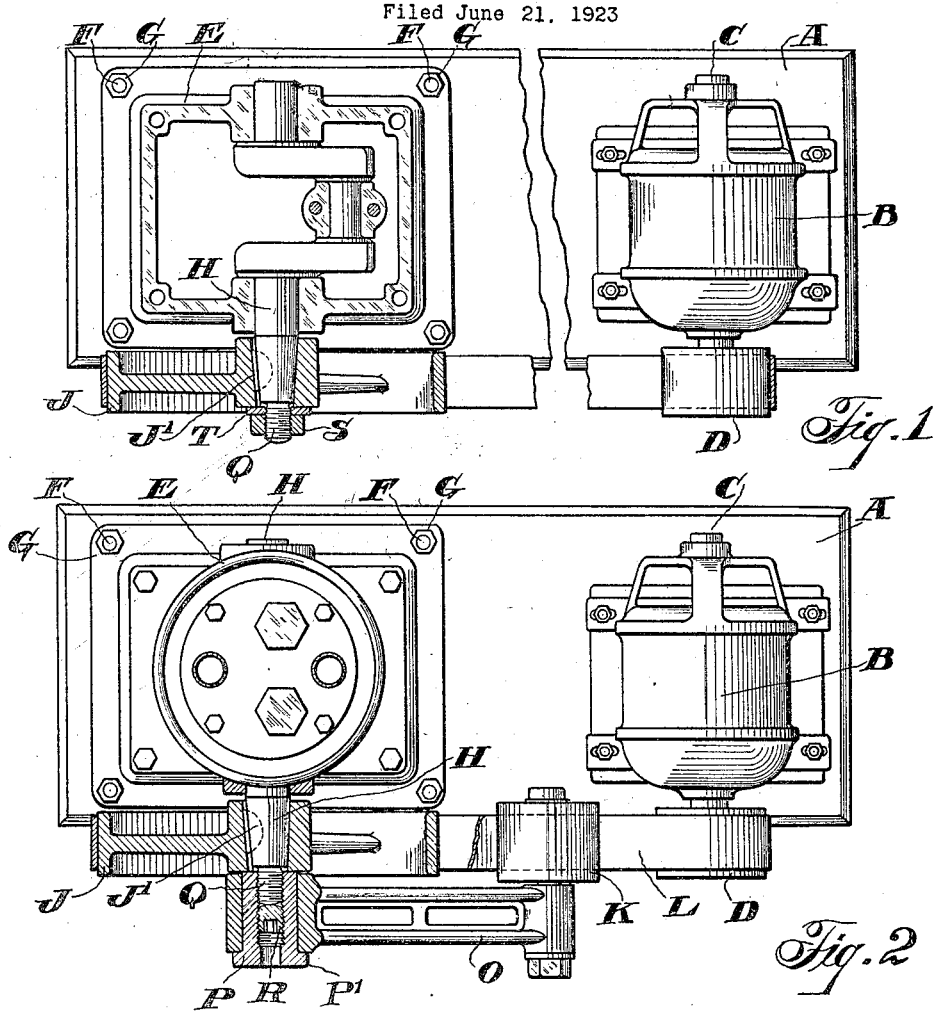
Fig.1
Fig.2
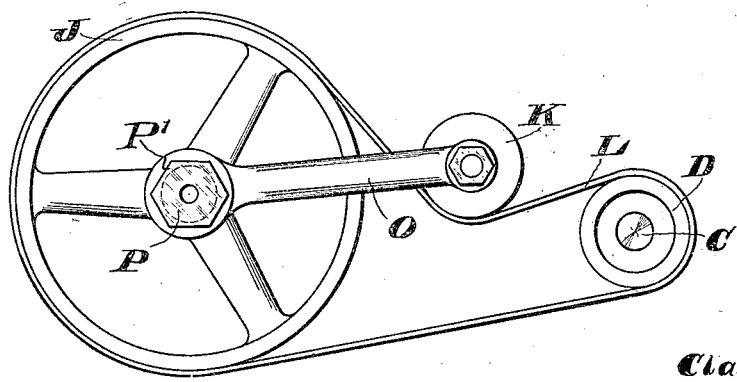
Fig.3
INVENTOR
Claude Pitts,
BY
HIS ATTORNEY Patented June 10, 1924.

1,497,226

UNITED STATES PATENT OFFICE.

CLAUDE PITTS, OF PAINTED POST, NEW YORK, ASSIGNOR TO INGERSOLL-RAND COMPANY, OF JERSEY CITY, NEW JERSEY, A CORPORATION OF NEW JERSEY.

SHORT BELT DRIVE.

Application filed June 21, 1923. Serial No. 646,739.

*To all whom it may concern:*

Be it known that I, CLAUDE PITTS, a citizen of the United States, and a resident of Painted Post, county of Steuben, and State of New York, have invented a certain Short Belt Drive, of which the following is a specification accompanied by drawings.

This invention relates to a belt drive for power driven apparatus, but more particularly to a short belt drive, when it is desired to locate the driving and driven elements near together.

One of the main objects of the present invention is to facilitate and simplify the operations required in changing from a long belt drive to a short belt drive.

Another object of the invention is to enable an idler pulley arm for a short belt drive to be readily and conveniently mounted on a removable bushing preferably secured to one end of the driven shaft, so that the assembly of parts is made more quickly and easily.

Further objects will hereinafter appear, and the invention is illustrated in one of its preferred forms in the drawings, in which—

Figure 1 is a top plan view partly in horizontal section of a compressor unit, showing a long belt drive.

Figure 2 is a top plan view partly in horizontal section of a compressor unit showing the short belt drive.

Figure 3 is a detail side view of the driven pulley, idler pulley and frame, and the driving pulley shown in Figure 2.

Referring to the drawings, A represents a base or bed plate having a driving element shown as a motor B mounted thereon, provided with a driving shaft C and a belt pulley D. A driven element shown in this instance as an air compressor E is also adapted to be mounted on the long base A or on separate bases in the usual manner, as by means of bolts F and nuts G. The compressor is provided with the driven shaft H on which the driven pulley J is adapted to be mounted and held thereon by any suitable means, as by the Woodruff key J'.

In Figure 1 showing a long belt drive, the motor B and compressor E are separated at any suitable distance, and in order to change from the long drive to the short drive shown in Figure 2, I provide an idler pulley K, adapted to bear upon the belt L to act as a belt tightener. The pulley K is carried by an arm O, which is pivotally mounted on a hollow bushing P preferably threaded on the reduced threaded end Q of the driven shaft H. The bushing P is in this instance formed with a flange P' which serves to retain the arm O in position. In order to lock the bushing P on the reduced threaded end Q of the shaft H, a locking plug R, in this instance threaded into the bushing P, is adapted to bear against the reduced threaded end Q of the shaft H, and may be tightened or screwed in by means of a socket wrench or other suitable tool.

The bushing P may be quickly and conveniently attached to the driven shaft of the compressor, and by means of the plug R, readily locked in place, so that the change from a long belt drive to a short belt drive can be made in a comparatively short length of time. The only parts which must be removed in order to make the change, are the nut S and washer T, shown in Figure 1, which assist in holding the driven pulley J on the shaft H.

I claim:

1. A short belt drive comprising a driven shaft having a reduced threaded end portion, a driven pulley adapted to rotate with said shaft, a hollow idler arm bushing threaded on said reduced end portion of the driven shaft, an idler arm pivotally mounted on said bushing, an idler carried by the idler arm, and means within said bushing for locking the bushing to the driven shaft.

2. A short belt drive comprising a driven shaft having a reduced threaded end portion, a driven pulley adapted to rotate with said shaft, an idler arm bushing screwed onto said reduced end portion of the driven shaft, an idler arm pivotally mounted on said bushing, a flange on said bushing for retaining said arm in position, an idler carried at the outer end of the idler arm, and a locking plug within the bushing for locking the bushing to the driven shaft.

In testimony whereof I have signed this specification.

CLAUDE PITTS.